United States Patent [19]
Nice

[11] Patent Number: 5,992,246
[45] Date of Patent: Nov. 30, 1999

[54] UNDERWATER CORROSION LOCATER

[75] Inventor: Sidney B. Nice, Humble, Tex.

[73] Assignee: Western Atlas International, Inc., Houston, Tex.

[21] Appl. No.: 09/056,308

[22] Filed: Apr. 7, 1998

[51] Int. Cl.$^6$ .................................................. G01M 19/00
[52] U.S. Cl. ........................... 73/865.8; 73/623; 73/866.5
[58] Field of Search ................................. 73/865.8, 866.5, 73/623, 624, 86; 367/140, 141

[56] References Cited

U.S. PATENT DOCUMENTS

| | | | |
|---|---|---|---|
| 4,888,745 | 12/1989 | Walther et al. | 367/129 |
| 4,951,263 | 8/1990 | Shope | 367/117 |
| 5,084,764 | 1/1992 | Day | 73/865.8 |

*Primary Examiner*—Hezron Williams
*Assistant Examiner*—Thuy Vinh Tran
*Attorney, Agent, or Firm*—Richard A. Fagin

[57] ABSTRACT

A system and method for identifying, locating and marking an underwater pipeline anomaly such as excessive pipe wall corrosion. An inspection tool is pulled through the pipeline with a cable. The cable length is precisely measured when a pipeline anomaly is detected, and a transmitter generates a signal representing the pipeline anomaly location. This measurement provides an accurate positioning system for deploying a mobile receiver, and the receiver identifies the transmitter signal for facilitating precise marking of the pipeline anomaly from the pipeline exterior. Accurate cable measurements are taken by a controller which monitors the magnitude and variations in cable tension and length.

18 Claims, 1 Drawing Sheet

UNDERWATER CORROSION LOCATER

BACKGROUND OF THE INVENTION

The present invention relates to the field of underwater pipeline inspection services. More particularly, the present invention relates to a system for efficiently detecting and marking a pipeline anomaly to facilitate pipeline repair operations.

Pipeline corrosion is monitored within a pipeline to prevent accidental discharge of pressurized pipeline fluids. Pipeline inspection services are particularly important for underwater pipelines because accidental pipeline fluid releases are virtually impossible to contain after the release has occurred. Inspection services survey a pipeline to identify excessive corrosion and other potential failure points. Such services are typically performed with equipment transported through the pipeline interior.

Various techniques have been developed to perform pipeline inspection services. Self-propelled inspection devices are used in many applications and depend on complicated transport mechanisms which are subject to failure. U.S. Pat. Nos. 4,560,931 to Murakami et al. (1985) and 5,090,259 to Shushido et al. (1992) described different self-propelled systems. Certain inspection devices have transmitters for marking the device location when the inspection device becomes stuck in the pipeline. However, tapes and other recording devices within the inspection device typically monitor the pipeline anomaly location.

After a pipeline anomaly such as a structural failure or excessive corrosion is charted, divers or remotely deployed vehicles mark the pipeline anomaly. Because the divers and remote vehicles must travel to the general water surface location of the pipeline anomaly, accurate identification of the anomaly coordinates are essential to efficient repair operations. After the surface location is reached, divers or remote vehicles dive to the pipeline elevation at the locating joint identified by the inspection apparatus. The pipeline route is followed, and each buried joint is uncovered until the suspect pipeline section is reached. This process is highly inefficient and consumes valuable time. The time required for locating the precise pipeline anomaly location, and the problems of missing such location altogether, depend on the measurement accuracy monitoring the inspection equipment location when the anomaly is detected. After the pipeline anomaly is marked exterior of the pipeline, the pipelines section can be repaired with a pipeline clamp, clockspring device, or other conventional repair technique.

Different techniques have been proposed to identify the location of inspection or cleaning equipment within a pipeline. In U.S. Pat. No. 3,754,272 to Carter et al. (1973), inspection signals were recorded on magnetic tape, and the passage of the inspection apparatus at known locations as recorded and correlated against the magnetic log. U.S. Pat. No. 4,747,317 to Lara (1988) disclosed onboard inertial equipment for recording apparatus movement. In U.S. Pat. No. 4,857,851 to Anderson et al. (1989), a magnetically activated sensor detected the passage of a pipeline pig, and this information was correlated against a tape recorder carried by the pig. In U.S. Pat. No. 5,506,505 to Worthen et al. (1994), a magnetic sensor detected the passage of a pipeline pig and raised a flag in response to such passage.

U.S. Pat. No. 5,084,764 to Day (1992) disclosed another technique for inspecting a water pipeline wherein a video camera and lights were attached to a neutrally buoyant cable. The camera was pulled through a pipeline by a deployment sail as a counter monitored the length and rate of cable deployment. A drive device controlled the cable release and retrieved the cable after the surveillance operations were performed. Day described measurement inaccuracies caused by map errors and unrecorded pipeline bends, however Day did not anticipate measurement errors resulting from variations in cable tension. As the deployment sail and frictional cable drag pull a camera through the pipeline, frictional drag and binding problems between the equipment and pipeline interior wall can cause slack in portions of the cable. The inability to monitor such slack introduces errors in the cable length measurements which become significant over long distances. As previously described, such errors can significantly lengthen the time required to locate the inspection equipment location.

A need, therefore, exists for an improved system for precise identifying the location of a pipeline anomaly within an underwater pipeline, and of facilitating the marking of such pipeline anomaly. The system should be reliable, easy to deploy, inexpensive to maintain, and should identify pipeline anomaly location with a high degree of precision.

SUMMARY OF THE INVENTION

The present invention provides a system for marking an underwater pipeline anomaly and a method of using the system. The system comprises an inspection means for identifying the pipeline anomaly, a cable attached to the inspection means for pulling the inspection means through the pipeline, a controller in communication with the inspection means for identifying the cable length between the controller and the pipeline anomaly, a transmitter for generating a signal representative of the pipeline anomaly location, and a receiver for detecting the transmitter signal. The receiver is transportable to a location at a distance correlating to the identified cable length, and is further capable of being manipulated to identify the pipeline anomaly location.

The method of the invention is practiced by pulling a cable through the pipeline, by operating an inspection means attached to the cable to identify the pipeline anomaly as the cable is pulled through the pipeline, by operating a controller to identify the cable length between the controller and the inspection means, by transmitting a signal from the inspection means which identifies the pipeline anomaly location, and by detecting the inspection means signal from the pipeline exterior.

DESCRIPTION OF THE PREFERRED EMBODIMENTS

Figure 1:
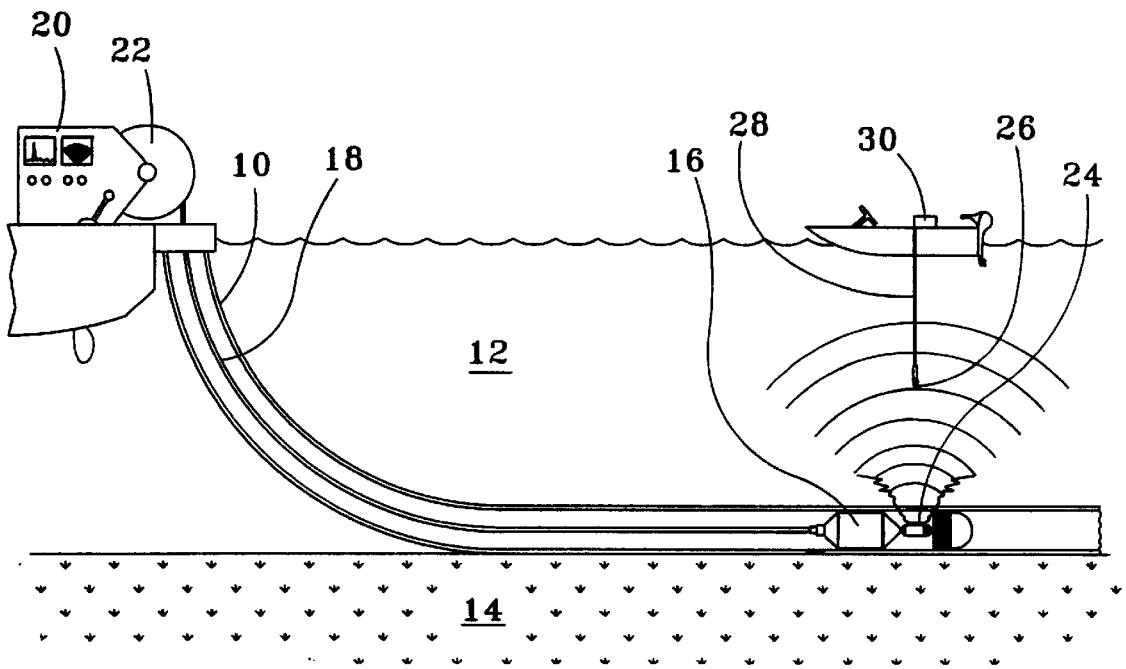
FIG. 1 illustrates an overview schematic view of the invention.

The present invention provides an improved system and method for identifying, locating, and marking pipeline anomalies. FIG. 1 illustrates a schematic representation for one embodiment of the invention wherein hollow pipeline 10 is located beneath water 12. Although pipeline 10 is shown on top of soil 14, the invention is operable for pipelines 10 buried within soil 14 as described below. Inspection means such as tool 16 is positioned within pipeline 10 and is attached to cable 18. Controller 20 is engaged with cable 18 for identifying the deployed length of cable 18 and for performing other functions. Winch 22 can be incorporated within controller 20 or can comprise a separate mechanism. Transmitter 24 is incorporated within tool 16 or is positioned at a selected orientation relative to tool 16. Receiver 26 is attached to umbilical 28 and to vessel 30 for remote deployment.

Figure 2:
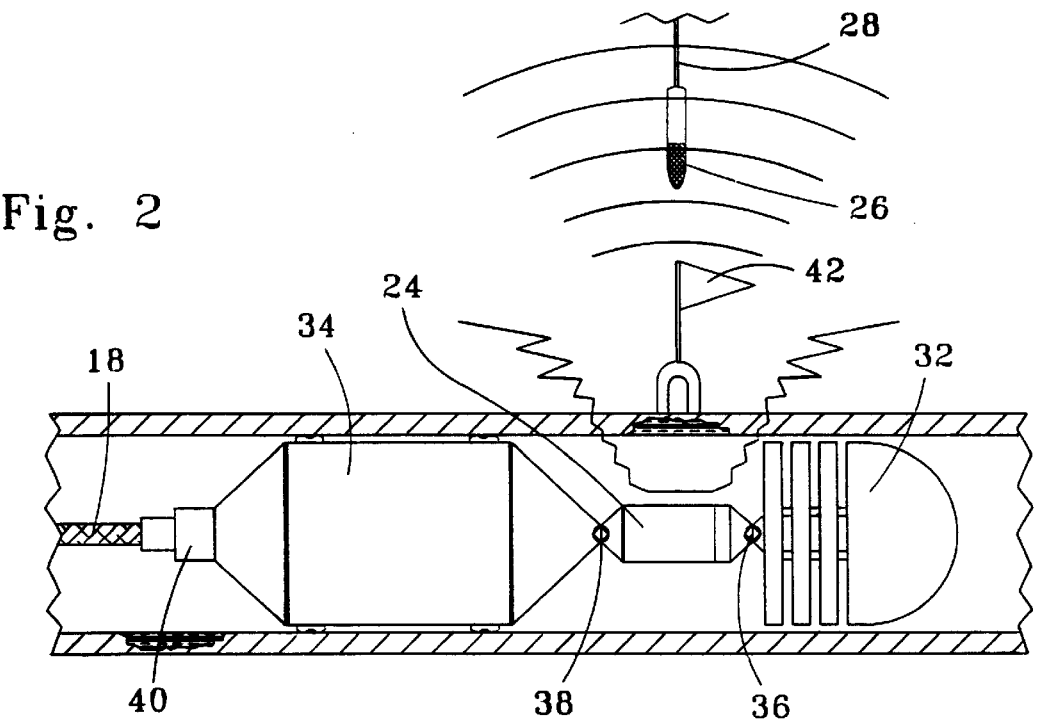
FIG. 2 illustrates a schematic elevation view of an inspection tool formed within a pig element.

FIG. 2 shows a schematic elevation view of the invention wherein tool 16 comprises launch pig 32, inspection pig 34, and transmitter 24. Launch pig 32 is attached to transmitter 24 with pin connection 36, and inspection pig 34 is attached to transmitter 24 with pin connection 38. Pin connections 36 and 38 provide for pivotal movement as tool 16 negotiates bends and partial obstructions within pipeline 10. Pin connections 36 and 38 can comprise simple pivots or can comprise swivels for greater degrees of articulated movement. Cablehead 40 connects inspection pig 34 to cable 18.

Launch pig 32 can be pumped or otherwise moved into pipeline 10 with conventional equipment and techniques. After pigs 32 and 34 are moved to a selected distance from controller 20, winch 22 is operated to take up slack in cable 18 until a certain static line tension is achieved. This technique calibrates cable 18 for stretch before inspection measurements are made. The static line tension quantity will depend on the clearance between pigs 32 and 34 with the interior wall of pipeline 10, the presence and composition and dynamics of fluid within pipeline 10, the rate of tool 16 movement, the buoyancy of cable 18 and tool 16, and other factors. Winch 22 preferably retrieves tool 16 from pipeline 10 at a uniform rate to reduce logging errors and to reduce differential stretching of cable 18 within pipeline 10. By maintaining constant tension during cable 18 retrieval, variations in the elongation of cable 18 are substantially reduced.

Controller 20 monitors the length and tension of cable 18 between controller 20 and tool 16 during cable 18 retrieval. After the initial static line tension is achieved by winch 22, cable 18 is slowly retrieved by winch 22 and inspection pig 34 is operated to survey the interior wall of pipeline 10. Variations in cable 18 tension can be identified by controller 20 and adjustments in the measured length of cable 18 can be calculated from the tension variations. Identification marks or discontinuities (not shown) can be placed on cable 18 to correlate the length 18 to the calculations performed by controller 20, and to provide for additional data in calibrating distance measurements.

As known in the art, inspection pig 34 can detect pipeline anomalies such as pipe corrosion, sediment accumulation, deformities and nonconformities in pipeline 10, the bearing and slope within pipeline 10 at any location, wall thickness of pipeline 10, and other features. Data from inspection pig 34 is transmitted to controller 20 through cable 18 or through another conductor (not shown) associated with cable 18, or through other techniques. Such data can be recorded by equipment located within tool 16, but is preferably transmitted to controller 20 to provide real time surveillance of inspection operations. Such data includes information identifying pipeline anomalies such as pipe wall corrosion, thereby identifying potential pipe areas requiring maintenance or repair operations.

If desired, divers or remotely controlled vehicles operating from a dive barge (not shown) can be on standby for deployment to the pipeline anomaly identified by tool 16. For example, sixty percent penetration of corrosion through the sidewall of pipeline 10 would typically comprise a suitable candidate for repair operations. After tool 16 identifies a pipeline anomaly, continued retrieval of tool 16 can be stopped and transmitter 24 can generate a signal indicating the position of the pipeline anomaly. Receiver 26 is manipulated until transmitter 24 signal is detected for steering receiver toward the pipeline anomaly location. After such location is verified exterior of pipeline 10, a marker such as magnetic base flag 42 can mark the anomaly on pipeline 10 for subsequent maintenance or repair operations.

In a preferred embodiment of the invention, divers or remotely controlled vehicles are not held on standby, thereby saving the cost of unused services. Tool 16 is run through pipeline 10 to perform inspection services, and a permanent log of such survey is made with recording equipment or with controller 20. The permanent log contains data derived by controller 20 regarding the length of cable 18 between controller 20 and each pipeline anomaly, and can be stored for later use. Subsequently, the pipeline 10 exterior can be marked by locating divers or remote controlled equipment on location. Tool 16 can re-enter pipeline 10 and tool 16 can be retrieved by winch 22 until the identified length of cable 18 is deployed away from controller 20.

Although tool 16 can comprise the same combination of components used for inspecting pipeline 10 (including inspection pig 24), tool 16 could be limited to transmitter 24 for generating the signal for detection by receiver 26. When transmitter 24 is located at the length identified on cable 18 as the site for the selected pipeline anomaly, transmitter 24 can be activated to generate a general broadcast signal or a signal representative of the particular pipeline anomaly. Receiver 26 is positioned on vessel 30 at the water surface at positioning coordinates corresponding to the identified cable length determined for the pipeline anomaly by controller 20. Receiver 26 is then lowered into proximity to pipeline 10 with a diver or remote control mechanism, and transmitter 24 guides receiver 26 precisely toward the selected pipeline anomaly.

This feature of the invention accurately places receiver 26 proximate to the pipeline anomaly by the operation of tool 16 in combination with cable 18 and controller 20. This capability significantly improves the efficiency of locating the pipeline anomaly and eliminates conventional operations unburying numerous pipeline joints. This increased efficiency reduces dive time and risk, and further avoids complications caused by missing the transmitter signal altogether.

Transmitter 24 and receiver 26 are sufficiently powerful to communicate through backfill and local soil 14 conditions that may cover pipeline 10 with five meters or more of soil. Marker flags 42 can comprise suitable devices attachable directly to pipeline 10 exterior or to soil 14 covering pipeline 10, and cam comprise various types of magnetic, adhesive, or anchor mechanisms. Tension in cable 18 can be monitored to provide for stretch corrections in the distance between controller 20 and tool 16.

The invention provides an interactive, real-time system and method for identifying pipeline anomalies, for locating and recording the position of each anomaly, and for physically marking the anomaly location. The invention provides a high degree of reliability and accuracy and does not depend on complicated mechanical components remote from surface operations. The invention significantly reduces anomaly marking dive time and risk by pinpointing the location of the transmitter tool precisely identifying the anomaly location. This feature of the invention provides for dive vessel placement directly over the pipeline anomaly, thereby reducing the dive time and possibility that the diver is unable to locate the inspection pig because the search efforts were initiated in the wrong location.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A system for marking an underwater pipeline anomaly, comprising:

an inspection means for identifying the pipeline anomaly;

a cable attached to said inspection means for pulling said inspection means through the pipeline;

a controller in communication with said inspection means for identifying the cable length between said inspection means and said controller when said inspection means identifies the pipeline anomaly, wherein said controller is capable of monitoring the tension in a portion of said cable and is capable of calculating corrections to said identified cable length due to variations in said cable tension;

a transmitter engaged with said inspection means for generating a signal; and a receiver for detecting said transmitter signal, wherein said transmitter is transportable to a location at a distance from said controller correlating to said identified cable length, and wherein said receiver is further capable of being manipulated to identify the pipeline anomaly location in response to said transmitter signal.

2. A system as recited in claim 1, wherein said controller is capable of monitoring the tension in a portion of said cable and is capable of calculating corrections to said identified cable length due to variations in said cable tension.

3. A system as recited in claim 1, wherein said cable is capable of transmitting signals between said controller and said inspection means.

4. A system as recited in claim 1, further comprising a winch for pulling said cable and attached inspection means through the pipeline at a selected rate.

5. A system as recited in claim 4, wherein said winch is capable of selectively ceasing movement of said cable when said inspection means identifies a pipeline anomaly.

6. A system as recited in claim 1, further comprising a marker for identifying the anomaly location.

7. A system for locating an underwater pipeline anomaly, comprising:

an inspection means for identifying the pipeline anomaly;

a cable attached to said inspection means;

a winch for pulling said cable and inspection means through the pipeline;

a controller engaged with said cable and with said inspection means for identifying the cable tension and length between said inspection means and said controller when said inspection means identifies the pipeline anomaly, wherein said controller is capable of calculating the distance between said controller and inspection means based on the cable tension and measured length;

a transmitter engaged with said inspection means for generating a signal; and a receiver for detecting said transmitter signal, wherein said transmitter is transportable to a location at a distance from said controller correlating to said identified cable length, and wherein said receiver is further capable of being manipulated to identify the pipeline anomaly location in response to said transmitter signal.

8. A system as recited in claim 7, wherein said controller is further engaged with said winch for controlling the retrieval rate of said cable.

9. A system as recited in claim 8, wherein said controller is capable of ceasing cable retrieval when said inspection means identifies the pipeline anomaly.

10. A system as recited in claim 7, wherein said controller is capable of modifying the identified cable length based on variations in said cable tension.

11. A system as recited in claim 7, further comprising at least one cable marker detectable by said controller for calibrating said identified cable length.

12. A method for locating and marking an underwater pipeline anomaly, comprising the steps of:

pulling a cable through the pipeline;

operating an inspection means attached to said cable to identify the pipeline anomaly as said cable is pulled through the pipeline;

operating a controller to identify the cable length between said controller and said inspection means when the pipeline anomaly is identified;

transmitting a signal from said inspection means which identifies the pipeline anomaly location; and detecting said inspection means signal from the exterior of the pipeline to identify the pipeline anomaly location; and operating said controller to identify the cable tension and to calculate the cable length from said identified cable length and the cable tension.

13. A method as recited in claim 12, further comprising the step of marking the location of the pipeline anomaly.

14. A method as recited in claim 12, further comprising the step of repairing the pipeline anomaly.

15. A method as recited in claim 12, further comprising the steps of operating said controller to identify the cable tension and to calculate the cable length from said identified cable length and the cable tension.

16. A method as recited in claim 12, further comprising the steps of operating said controller to identify variations in the cable tension, and of calculating the identified cable length based on the measured cable length and said cable tension variations.

17. A method for locating and marking an underwater pipeline anomaly, comprising the steps of:

pulling a cable through the pipeline;

operating an inspection means attached to said cable to identify the pipeline anomaly as said cable is pulled through the pipeline;

operating a controller to identify the cable length between said controller and said inspection means when the pipeline anomaly is identified;

transmitting a signal from said inspection means which identifies the pipeline anomaly location;

detecting said inspection means signal from the exterior of the pipeline to identify the pipeline anomaly location;

deploying a receiver into the water at a distance from the controller corresponding to said cable length identified by said controller;

operating said receiver to detect said inspection means signal.

18. A method for locating and marking an underwater pipeline anomaly comprising the steps of:

pulling a cable through the pipeline;

operating an inspection means attached to said cable to identify the pipeline anomaly as said cable is pulled through the pipeline;

operating a controller to identify the cable length between said controller and said inspection means when the pipeline anomaly is identified;

transmitting a signal from said inspection means which identifies the pipeline anomaly location;

detecting said inspection means signal from the exterior of the pipeline to identify the pipeline anomaly location; and moving a vessel to a location proximate to the pipeline anomaly identified by said controller before the receiver is deployed into the water.

* * * * *